(12) United States Patent
Theuerkauf et al.

(10) Patent No.: US 8,459,721 B2
(45) Date of Patent: Jun. 11, 2013

(54) TOP FOR A CONVERTIBLE VEHICLE

(75) Inventors: Juergen Theuerkauf, Bramsche (DE);
Norbert Habacker, Bramsche (DE);
Michael Schroeder, Bissendorf (DE);
Andreas Baumeier, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 202 days.

(21) Appl. No.: 12/744,716

(22) PCT Filed: Nov. 5, 2008

(86) PCT No.: PCT/DE2008/001822
§ 371 (c)(1),
(2), (4) Date: Jul. 13, 2010

(87) PCT Pub. No.: WO2009/067977
PCT Pub. Date: Jun. 4, 2009

(65) Prior Publication Data
US 2010/0276965 A1 Nov. 4, 2010

(30) Foreign Application Priority Data

Nov. 28, 2007 (DE) .......................... 10 2007 057 324

(51) Int. Cl.
*B60J 7/08* (2006.01)
(52) U.S. Cl.
USPC ....................... 296/121; 296/100.05; 296/122
(58) Field of Classification Search
USPC .......... 296/121, 122, 100.02, 100.05, 107.01, 296/107.16
See application file for complete search history.

(56) References Cited

U.S. PATENT DOCUMENTS

| | | | |
|---|---|---|---|
| 2,602,692 A | 7/1952 | Urquhart | |
| 5,839,778 A | 11/1998 | Schaible et al. | |
| 5,868,454 A | 2/1999 | Homann et al. | |
| 6,033,008 A | 3/2000 | Mattila | |
| 6,033,009 A | 3/2000 | Ritter et al. | |
| 6,511,118 B2 | 1/2003 | Liedmeyer et al. | |
| 2004/0189039 A1 | 9/2004 | Wagner | |

FOREIGN PATENT DOCUMENTS

| | | |
|---|---|---|
| DE | 4415969 A1 | 11/1995 |
| DE | 103 13 496 A1 | 10/2004 |
| EP | 1798085 A1 | 6/2007 |
| FR | 2891203 A1 * | 3/2007 |

* cited by examiner

*Primary Examiner* — Glenn Dayoan
*Assistant Examiner* — Melissa A Black
(74) *Attorney, Agent, or Firm* — Gifford, Krass, Sprinkle, Anderson & Citkowski, P.C.; Douglas L. Wathen (57) ABSTRACT

A top for a convertible motor vehicle includes a top linkage operable to move the top between a closed position and an open position. The top linkage includes at least one functional component having a first position and a second position. The functional component is generally in the first position at a start of the opening movement and at the start of the closing movement, and also at an end of an opening movement and at the end of the closing movement. The functional component is moved from the first position to the second position for at least a portion of the opening movement and of the closing movement when the top linkage is between the open and closed positions. The movement of the functional component from the first position to the second position provides clearance for at least one element that moves during movement of the top linkage.

15 Claims, 7 Drawing Sheets

TOP FOR A CONVERTIBLE VEHICLE

REFERENCE TO RELATED APPLICATIONS

This utility patent application is the U.S. National Phase application of PCT/DE2008/001822, filed Nov. 5, 2008, which claims priority from DE 10 2007 057 324.5, filed Nov. 28, 2007, the entire contents of both of which are incorporated herein in their entirety.

FIELD OF THE INVENTION

The present invention relates to a top for a motor vehicle, in particular for a convertible vehicle, which can be displaced between a closed position and an open position by means of a top mechanism.

BACKGROUND OF THE INVENTION

Tops for convertible vehicles are known which are made with functional components, for example for the fixing of the top in an open state, with said functional components adopting a fixed position irrespective of a top movement.

Such a top is known from EP 0 763 439 A1 in which the functional component is a locking latch of a rear-side locking device. The locking device is provided to fix the top in a stowed position. To fix the top in the stowed position, a latching hook of a latching member in a front top section pivots into a locking latch.

During top movement, the locking latch of the locking device is fixed in a position so that movement of top elements, textile components and trim elements has to be carried out such that the top elements do not collide with the locking latch of the locking device during their movement. The arrangement and the movement process of the top elements can thus be limited by the locking latch of the locking device.

SUMMARY OF THE INVENTION

Embodiments of the present invention provide a top for a convertible vehicle, in which at least one functional component of the top is arranged in such a flexible manner that there is a lot of freedom in the arrangement and movement configuration of elements moved during the top movement. Such moving elements may include top elements, trim elements and textile components. Movement of these elements is made possible in a simple manner.

The present invention provides a top for a convertible vehicle, which can be displaced between a closed position and an open position by means of a top mechanism. The top has at least one functional component which adopts an at least approximately identical first position both at a start of an opening movement or of a closing movement of the top and at an end of an opening movement or closing movement of the top. In accordance with the invention, when the is top located between its closed position and its open position, the at least one functional component is movable from its first position at least for a while for the release of a movement space for at least one element that moves when the top moves.

With a top in accordance with the invention, the movement space available for a moving element can be designed in a flexible manner, and possibly increased. The functional component releases the movement space required for the moving top element depending on the movement of the top. Such a movement of the functional component can naturally also be adapted to a plurality of elements moved when the top moves.

Provision can furthermore also be made that a plurality of functional components of the top are made movable and are movable during movement of the top. This provides freedom in the design of the elements and their movement.

In some embodiments the functional component performs a pivot movement into a second position for the release of a movement space for the element when the top moves, and it can be pivoted back from the second position into the first position.

A simple mechanism can hereby be provided for the release of a movement space for an element that moves when the top moves. However, in addition to the named pivot movement, other types of movement are also possible. For example, the movement of the functional component can be in translation or coupled from translatory and rotary movement elements.

In preferred embodiments, movement of the functional component is controlled by the movement of the top. A separate drive device may be provided for moving the functional component from its first position into its second position.

The use of such a drive device makes it possible that the functional component can be pivoted in a very flexible manner. Provision can be made in this respect that the drive device cooperates with a controller, in particular with a top controller, via which a specific movement pattern can be transmitted from the drive device to the functional component and the functional component can be moved between its first position and its second position.

A very cost-effective and simple mechanism for the movement of the functional component is provided when the functional component is movable from its first position into its second position by a cooperation with a top element, such as a top linkage, that moves when the top moves.

The functional component may be moved by the top element, which moves when the top moves, so as to release a movement space for another top element that moves when the top moves. Alternatively, the element that moves when the top moves may also move the functional component out of its own movement space by its cooperation with the functional component.

To be able to ensure a moderate, low-wear and low-load cooperation of the top element, which moves when the top moves, with the functional component, the top element may have a slide element formed for cooperation with a counter-slide element on the functional component at least for the movement of the functional component from its first position into its second position.

The counter-slide element may be formed with a run-on chamfer to provide a flowing increase of force acting on the functional component during movement of the top, such that a jerky force transmission can be avoided.

The top element, which moves when the top moves, may move the functional component from its own movement path when movement of the top element is in a movement plane which is generally perpendicular to a movement plane of the functional component, in which its pivot movement is carried out.

To simplify movement of the functional component during a top movement, a spring device may be provided to pivot the functional component from its second position into its first position.

In a preferred embodiment, the functional component is formed as a locking device which is provided for the fixing of the top in its stowed position.

In a very simple embodiment of a top, the locking device can be disposed at a main bearing of the top by means of a screw connection. The locking device may be pivotally supported by a hinge device.

A top in accordance with the invention can be fixed in its stowed position in a simple manner when the locking device is made with a latching counter-element. The latching counter-element cooperates with a latching element of a latching device disposed in a front top region. Vibrations of the top during travel can thereby be reduced and damage to the top or to elements arranged in the region of the top can be avoided.

A simple cooperation for the fixing of the top in its stowed position can be made possible in that the latching counter-element has a cut-out which can be brought into engagement with a latching element of the latching device that is a latching hook.

The latching counter-element of the locking device may be a generally plate-shaped element, with the latching element of the latching device being a latching hook. The latching hook is movable beneath the plate-shaped element of the locking device in the stowed position of the top such that a movement of the top in the upward direction of the vehicle is prevented by the locking device.

The plate-shaped element provides a support for the stowed top, with the plate-shaped element being able to be made such that a trunk of the convertible vehicle can also be given a very appealing design and/or a trunk volume can be made very large even when the support is not used.

It is desirable that the top is made manually releasable if the closure mechanism fails when the top is fixed in its stowed position. The locking device may be manually manipulated or influenced when the top is open, such as for emergency actuation of the top. The top, in the open position, is released to allow movement into its closed position. The locking device can be made such that a bolt that pivotally supports the device in a hinge device can be manually removed.

The top can be manually unlatched from its stowed position by manually moving the locking device from its first position towards its second position. This brings the locking device out of engagement with the latching device. The top can subsequently be manually or automatically moved into its closed position.

In a preferred embodiment, the latching device latches the top in a closed position, in addition to the fixing the top in a stowed position. The latching device, which may be in a front region of the top, cooperates with a counter-element arranged at an A pillar or at a windshield frame of the convertible vehicle. The latching device can thus be used in a multifunctional manner, whereby components can advantageously be saved.

Further advantages and advantageous embodiments of a top in accordance with the invention result from the claims, the drawings and the description.

BRIEF DESCRIPTION OF THE DRAWINGS

Advantageous embodiments of the present invention are described schematically in the following with reference to the drawings.

DETAILED DESCRIPTION OF THE INVENTION

Figure 1:
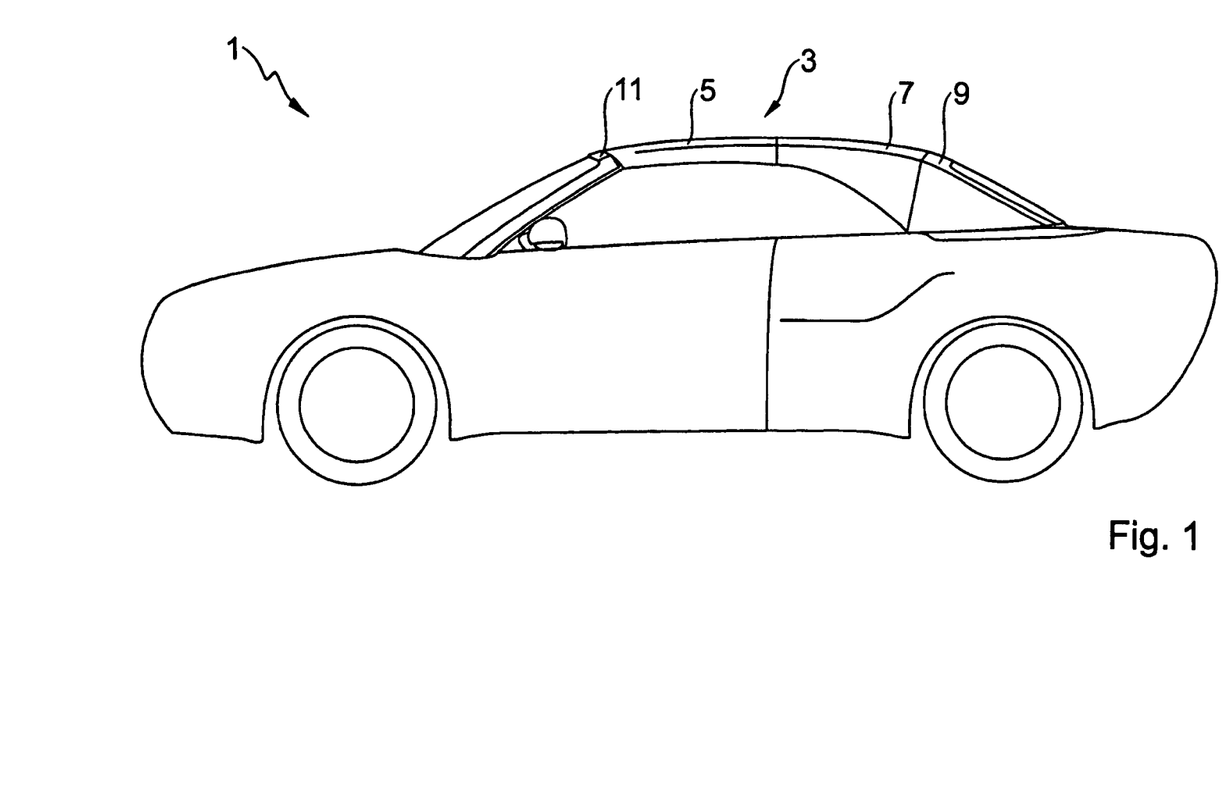
FIG. 1 is a simplified representation of a convertible vehicle with a top in a closed position.

A convertible vehicle 1 is shown in FIG. 1 with a top 3. The illustrated top is a hard top and can be displaced between a closed position shown in FIG. 1 and an open position.

The top 3 is made with three roof parts 5, 7, 9, with the front roof part 5 being able to be fixed to a windshield frame 11 in the closed position of the top 3. A latching apparatus 13, such as shown in FIG. 2, is provided for locking the top 3 to the windshield frame 11.

The top 3 can be displaced between the closed position shown in FIG. 1 and an open position of the top 3 in which the top 3 is stowed in its rear-side stowage position by means of a top linkage 15. The top linkage 15 is pivotally connected in a rear region to a main bearing 17, provided for fastening the top 3 to a body of the convertible vehicle.

The terms bottom/downwardly, top/upwardly, rear, front and center each relate to the convertible vehicle 1 in its state of use observed in the direction of the front of the vehicle.

Figure 2:
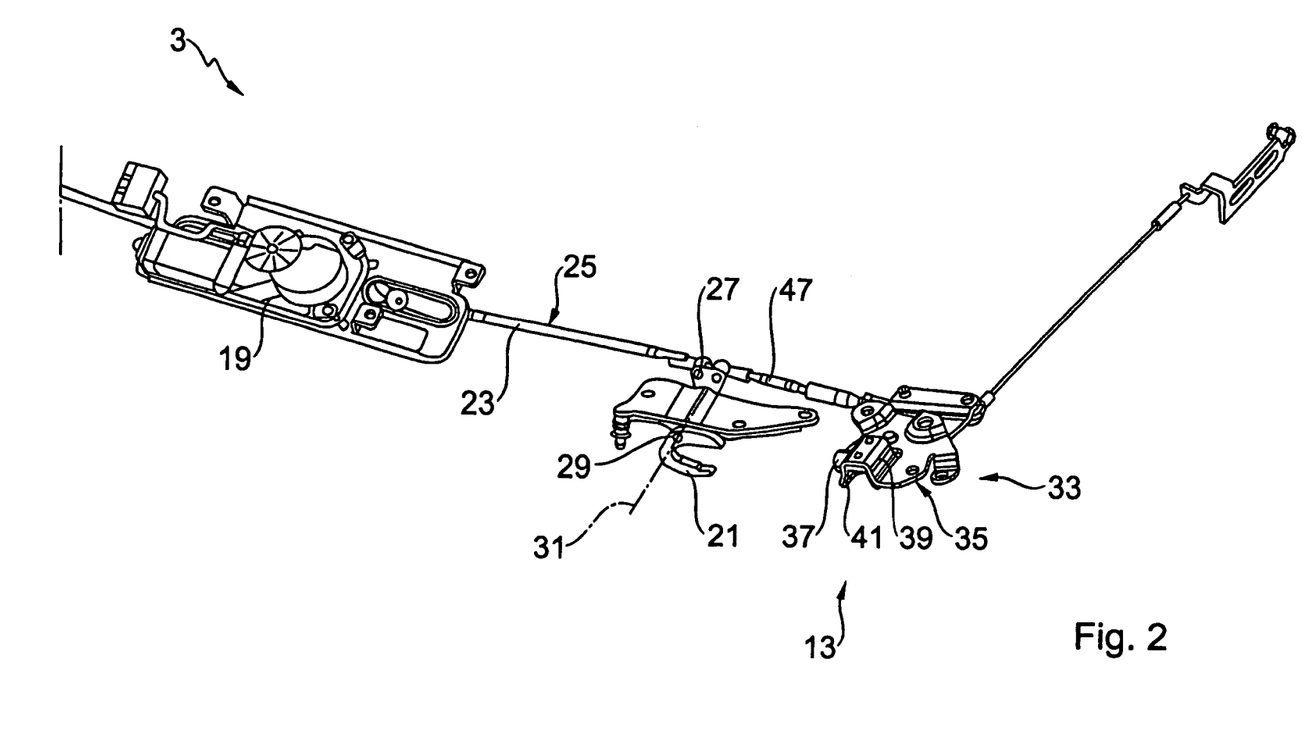
FIG. 2 is a simplified representation of a drive mechanism for fixing the top to a windshield frame in a closed position and for fixing the top in a stowage space in an open position.

In FIG. 2, a drive member can be seen which is arranged in a front center region of the front roof part 5. The drive member is a center drive 19 and is operable to latch the top 3 to the windshield frame 11 when the top 3 is in the closed position. The center drive 19 actuates a first closure hook 21 of the latching apparatus 13 fixed to the front roof part 5 of the top 3.

A drive rod 23 of a linkage 25 has an end remote from the center drive 19 that is connected to a triangular articulated lever 27. The articulated lever 27 is rotatably fixed to the latching apparatus 13 via a bolt 29. The bolt 29 is rotationally fixedly connected at its end remote from the articulated lever 27 to the first closure hook 21.

The center drive 19 can move the drive rod 23 in the transverse direction of the top to fix the first closure hook 21 to the windshield frame 11, by pivoting the articulated lever 27 at the latching apparatus 13 fixed to the top. This causes a rotation of the bolt 29 about the axis 31, thereby pivoting the first closure hook 21. This brings the first closure hook 21 into engagement with a counter-element at the windshield frame 11 when the top is in the closed position. The first closure hook 21 can be released from the counter-element at the windshield frame 11 by a movement of the drive rod 23 in the reverse direction.

In order to secure the top 3 in an open position, the latching apparatus 13 has a closure device 33. The closure device 33 has a sheet metal element 35, which can be fixed to the front roof part 5, and a second closure hook 37 pivotally connected to the sheet metal element 35.

The sheet metal element 35 is made with a U-shaped region 39, with the second closure hook 37 being pivotally connected to the sheet metal element 35 such that the closure hook 37 can either be pivoted into a cut-out 39 formed in a limb 41 of the U-shaped region 39 or can be pivoted out of the cut-out when moved by the center drive 19.

Figure 3:
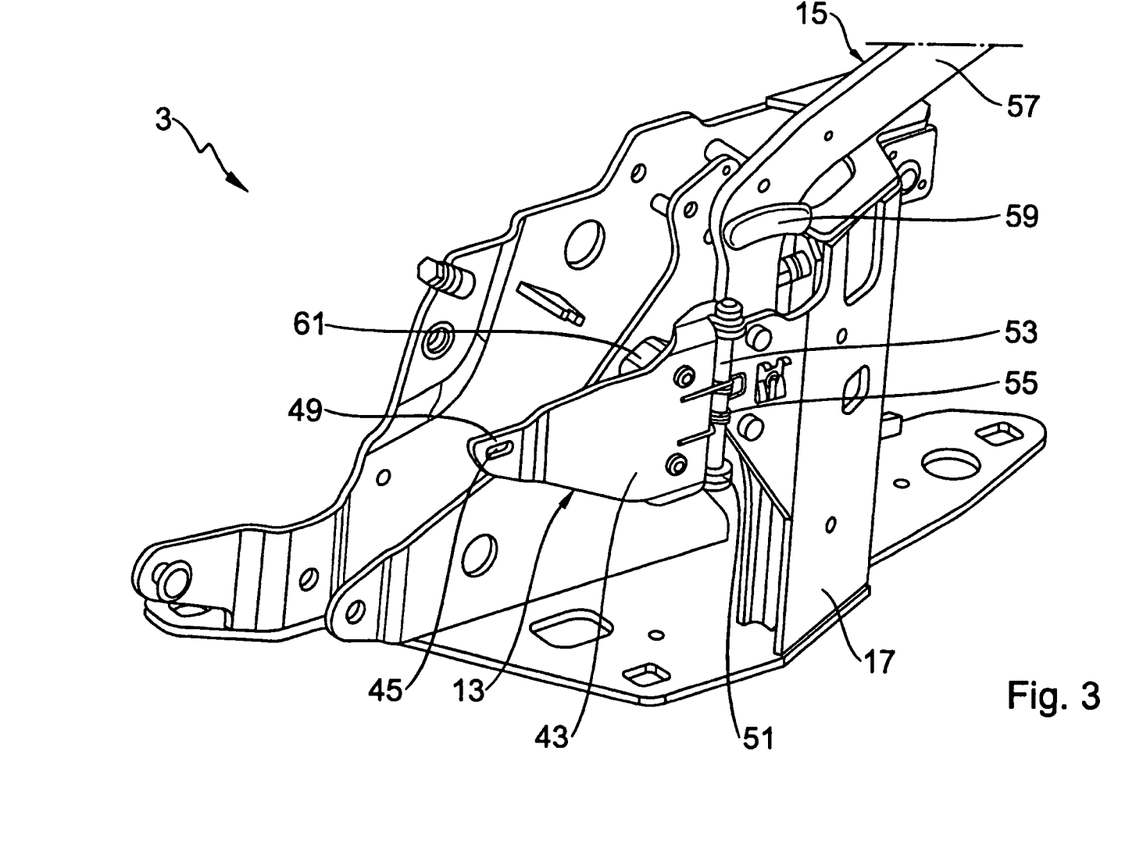
FIG. 3 is a simplified representation of a main bearing of the top of FIG. 1 with a locking device arranged thereon, with the locking device being shown in a first position with the top closed.

To fix the top 3 in the open position, the closure device 33 can cooperate with a functional component. Referring to FIG. 3, the functional component may be a locking device 43. The second closure hook 37 of the latching apparatus 13 may be brought into engagement with a cut-out 45 in the locking device 43, such that the cut-out acts as a latching element for cooperation with the closure device 33.

Figure 6:
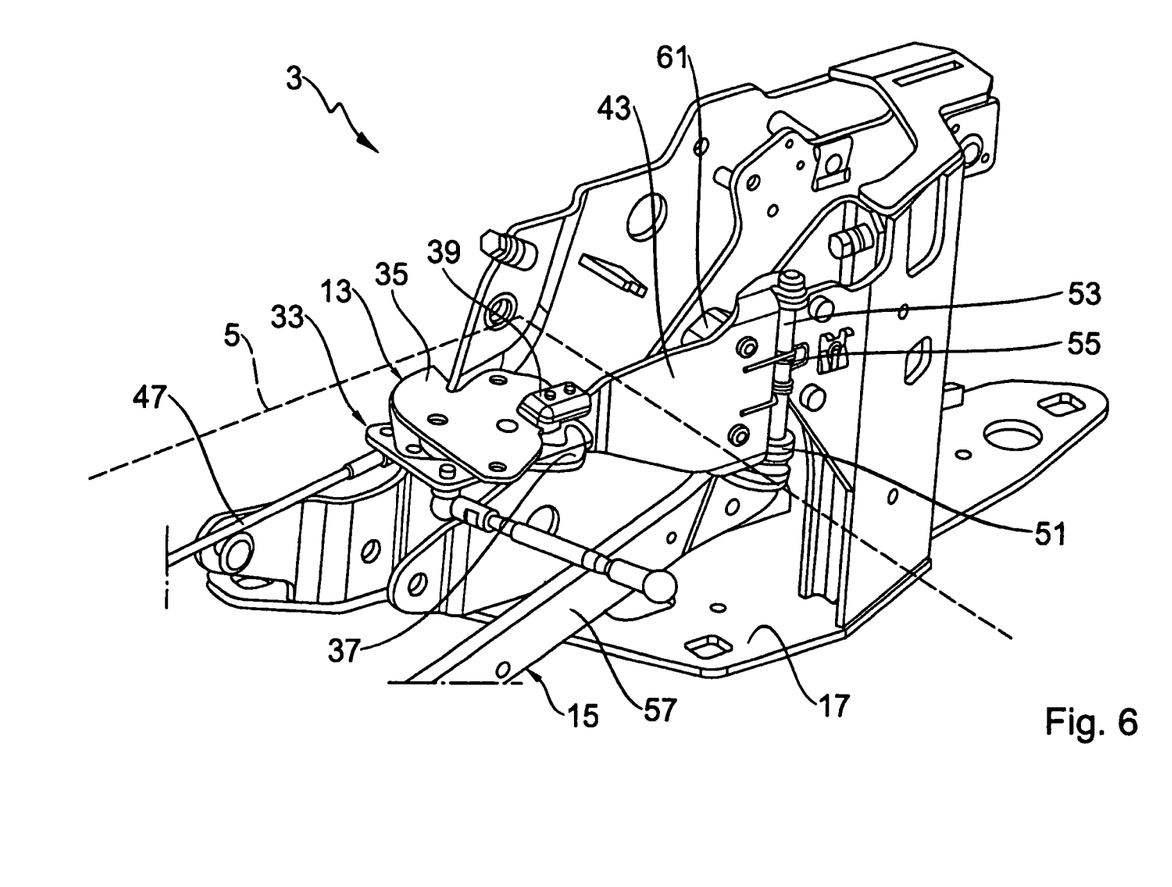
FIG. 6 is a simplified three-dimensional representation of the main bearing with the locking device located in the first position with the top open, with a latching device on a roof part of the top engaging the locking device.

When the top 3 moves from the closed position into its open position, the top linkage 15 is pivoted into its open position at the main bearing 17. This causes the closure device 33 to be moved toward the locking device 43, as shown in FIG. 6. The U-shaped region 39 of the sheet-metal element 35 comes into contact with the locking device 43 and the second closure hook 37 of the closure device 33 can be brought into engagement with the cut-out 45 of the locking device 43.

The second closure hook 37 is connected to a coupling rod 47 to cause inward and outward pivoting of the hook 37 into the cut-out 45 of the locking device 43. The coupling rod has an end remote from the second closure hook 37 that is connected to the articulated lever 27. The articulated lever 27 is pivoted about the bolt 29 by the drive rod 23 of the linkage 25. The drive rod 23 is moved by the center drive 19, thereby moving the coupling rod 47, which is connected to the articulated lever 27. The coupling rod 47 is moved generally in the transverse direction of the top.

Movement of the coupling rod 47 causes the second closure hook 37 to be rotated clockwise about its articulated connection with the sheet-metal element 35. This causes the second closure hook 37 to be rotated into the cut-out 45 of the locking device 43.

The top linkage 15 cannot be moved upwardly with the second closure hook 37 in the position shown in FIG. 6 since the region 49 located above the cut-out 45 of the locking device 43 prevents such a movement of the second closure hook 37. A high stiffness of the stowed top is achieved by fixing the top 3 to the body in its open position, which is particularly advantageous when the convertible vehicle is moving, since it reduces vibrations of the top.

To release the top 3 from the secured stowage position, the drive rod 23 of the linkage 25 is moved by the center drive 19 toward the latching apparatus 13. The coupling rod 47 is hereby moved via a pivoting of the articulated lever 27 into a position away from the center drive 19 and thereby rotates the closure hook 37 counter-clockwise about its fixing to the sheet metal element 35 out of the cut-out 45 of the locking device 43.

The top 3 can subsequently be moved from its open position into its closed position since the top linkage 15 is then no longer held by the locking device 43 arranged at the main bearing 17. The front roof part 5, including the sheet metal element 35, moves upwardly away from the locking device 43. The locking device 43 does not have any further function when the top is closed.

The locking device 43 is connected to the main bearing 17 by means of a hinge device 51, with the latching device 43 being pivotably supported by means of a support bolt 53 in the hinge device 51.

The locking device 43 furthermore has a spring device which is formed as a yoke spring 55 and which holds the locking device 43 in its first position shown in FIG. 3, for example.

Though not shown, the top may have a top liner, which would intrude into the area occupied by the locking device 43 when it is in its first position. Therefore, the locking device 43 is pivoted from its first position into a second position, shown, for example, in FIG. 5, during movement of the top.

Figure 5:
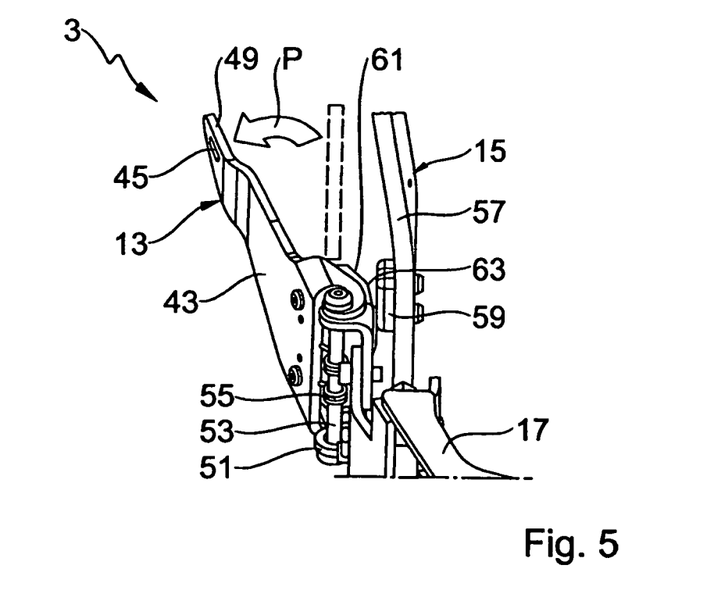
FIG. 5 is a simplified three-dimensional representation of a section of the main bearing in accordance with FIG. 4, with the locking device being shown in a second position during movement of the top.

The locking device 43 is moved along an arrow P shown in FIG. 5 from the first position shown by a dashed line up to the second position. The first position is towards the vehicle center The movement space need to clear the top liner component while the top is moving is thereby released by the locking device 43. The locking device 43 is moved back into its first position after the top liner component is moved through the area occupied by the locking device 45 when it is in the first position.

Movement of the locking device 43 from its first position into its second position is under compulsory control via a cooperation with a top element, namely lever 57, of the top linkage 15.

When the lever 57 pivots about the main bearing 19, the pivot movement of the lever is carried out at least approximately in a movement plane arranged parallel to a center plane of the vehicle. The lever 57 has a slide element 59 that cooperates with a counter-slide element 61 on the locking device 43. The locking device 43 is thereby pivoted about the hinge device 51, with this pivot movement of the locking device 43 being in a movement plane which extends at least approximately perpendicular to the movement plane of the lever 57.

Figure 4:
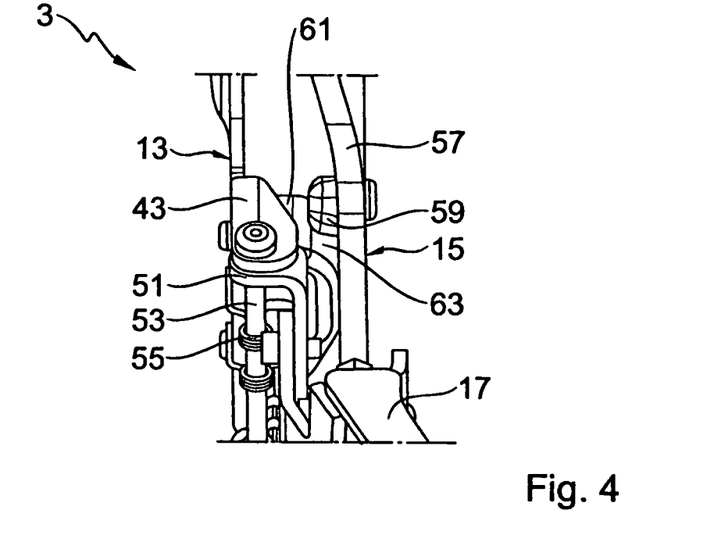
FIG. 4 is a simplified three-dimensional representation of a section of the main bearing of FIG. 3, with the locking device.
Figure 7:
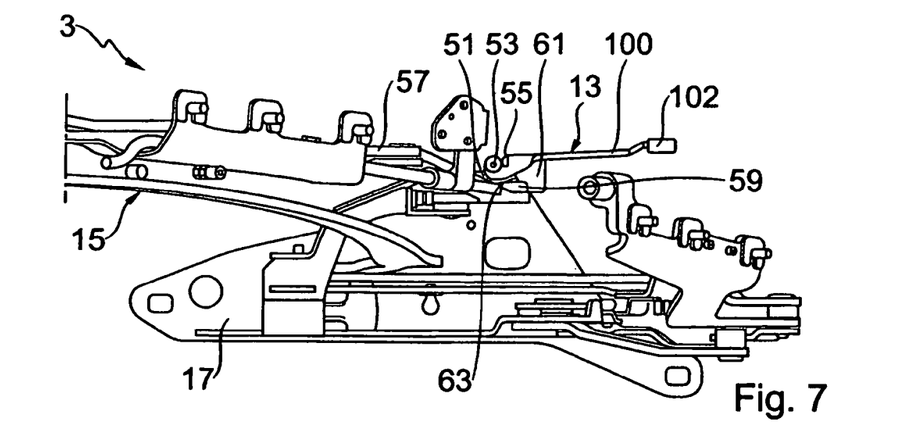
FIG. 7 is a simplified three-dimensional representation of the main bearing of FIGS. 1 to 6 with an alternatively designed locking device in its first position with the top closed.
Figure 8:
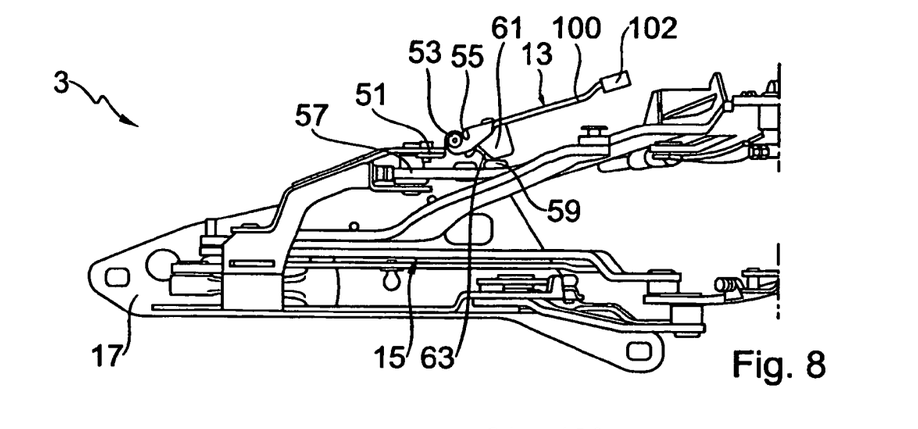
FIG. 8 is a simplified three-dimensional representation of the main bearing with the locking device of FIG. 7 shown in its second position during movement of the top.
Figure 9:
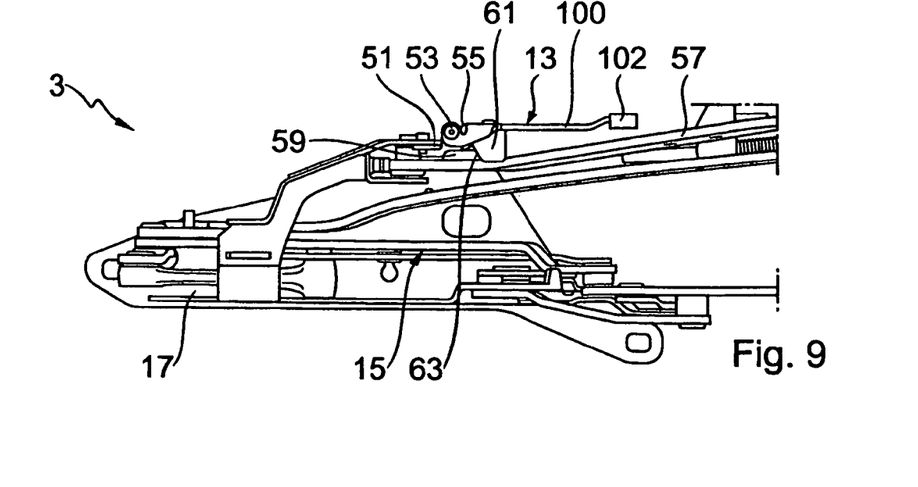
FIG. 9 is a simplified three-dimensional representation of the locking device of FIG. 8 with the top open, with the top being fixed to the locking device by a latching device arranged on a roof part.
Figure 10:
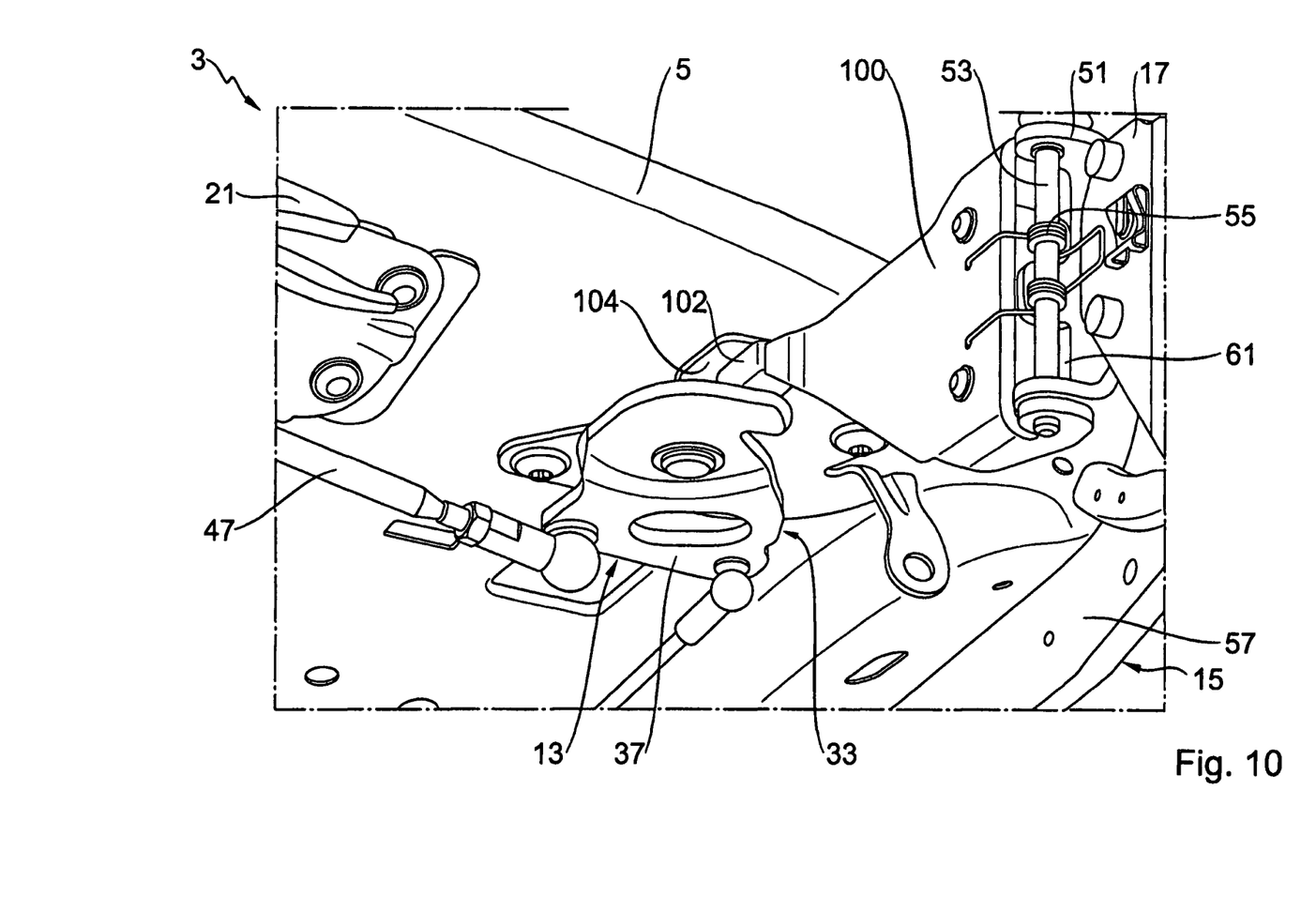
FIG. 10 is a simplified three-dimensional representation of the locking device in engagement with a latching device arranged on a roof part of the top.

The movement of the locking device 43 from its first position into its second position is shown in FIGS. 4 to 6. FIGS. 7 to 9 show an alternative locking device 100 moving between the first and second positions. FIGS. 7 to 9 show this movement from a different perspective than FIGS. 4 to 6.

The top 3 in FIG. 4 and FIG. 7 is shown in a closed position, with the locking device 43 or 100 being located in its first position. The top 3 is then pivoted into its position in FIG. 5 or FIG. 8, with the slide element 59 connected to the lever 57 coming into engagement with the counter-slide element 61 of the locking device 43 or 100 and the locking device 43 or 100 being pivoted about the hinge device 51 from its first position into its second position.

When the locking device 43 or 100 is in its second position, the inner liner component is located in the area which the locking device 43 or 100 occupies in its first position.

The yoke spring 55 arranged at the locking device 43 or 100 presses the locking device 43 or 100 toward the lever 57 in this intermediate position of the top 3 and ensures a contact of the slide element 59 with the counter-slide element 61.

To design this transition in as flowing a manner as possible, the counter-slide element 61 of the locking device 43 or 100 is provided with a run-on chamfer 63 at the side that first comes into contact with the slide element 59 and the slide element 59 of the lever 57 is formed with rounded edges.

When the top 3 is subsequently displaced from the intermediate position shown in FIG. 5 or FIG. 8 into its open position shown in FIG. 6 or FIG. 9, the lever 57 pivots further about the main bearing 17. The slide element 59 on the lever 57 is moved away from the counter-slide element 61 of the locking device 43 or 100 and is moved out of engagement.

The force exerted by the yoke spring 55 onto the locking device 43 or 100 then moves the locking device from its second position back into its first position. The first position is no longer occupied by the inner liner component. With the locking device in the first position, the second closure hook 37 can fix the stowed top 3 to the locking device 43 or 100. The front roof part 5 is shown by a dashed line in FIG. 6.

It is also necessary to pivot the locking device 43 or 100 from its second position into its first position because space is required for a parcel shelf, not shown.

A movement of the top 3 from its open position into its closed position is carried out in a reverse order to the steps just described, that is from FIG. 6 to FIG. 4 and from FIG. 9 to FIG. 7.

In the event of a failure of the latching device 13, in particular when the center drive 19 has a malfunction, an emergency actuation mechanism is provided by means of which the latching device 43 or 100 can be brought out of engagement with the second closure hook 37 of the latching device 13 with the top 3 in the open position.

In this respect, the locking device 43 or 100 can, on the one hand, be moved manually against a spring force of the yoke spring 55 from its first position into its second position, whereby the locking device 43 or 100 can be brought out of engagement with the second closure hook 37 of the latching device 13.

On the other hand, the locking device 43 or 100 can be removed by a dismantling of the support bolt 53. The top 3 is also then released here via a pivoting about the main bearing 17 for a movement from the open position into the closed position.

The locking device 100 shown in FIGS. 7 to 10 has been changed with respect to the locking device 43 shown in FIGS. 2 to 6. The locking device 100 does not have any cut-out at its forward end, but rather there has a plate-shaped element 102 forming a latching counter-element for cooperation with the closure device 33. In this embodiment, the closure device 33 can advantageously be formed simply with only the second closure hook 37.

Provision can also be made in this respect that the second closure hook 37 of the closure device 33 can be moved separately by a separate drive.

The procedure for latching the second closure hook 37 of the latching device 13 is unchanged in this embodiment. However, the closure hook 37 engages beneath the plate-shaped element 102 of the locking device 100 after the plate element 104 of the front roof part 5, visible in FIG. 10, comes into contact with the plate-shaped element 102 of the locking device 100. The top 3 is thus fixed in the upward direction of the vehicle by the latching device 13 and secures the position of the top 3 in its stowed position.

In an alternative embodiment of the invention, provision can be made that a single closure hook is provided, which is in particular arranged at a front roof part, for the fixing of the top in its open position and for the fixing of the top in its closed position.

Other functional parts, in addition to the locking device, can naturally also be made movable between an open position and a closed position during movement of a top and can provide space during the movement of the top for corresponding other elements such as textile components or trim devices.

In addition to the three-part hard top described here, the invention can also be used with two-part or multi-part hard-tops and with other top types for convertible vehicles such as soft-tops.

As will be clear to those of skill in the art, the herein disclosed embodiments of the present invention may be altered without departing from the scope or teaching of the present invention. It is the following claims, including all equivalents, which define the scope of the invention.

The invention claimed is:

1. A top for a convertible motor vehicle, the top being movable between a closed position and an open position, the top comprising:
    a top linkage operable to move the top between the closed position and the open position, the top linkage having an opening movement wherein the top linkage moves the top from the closed position to the open position, the top linkage further having a closing movement wherein the top linkage moves the top from the open position to the closed position, the top linkage including a top element movable therewith, the top element being pivotable in a first movement plane; and
    the top linkage including at least one functional component, the functional component having a first position and a second position, the at least one functional component being generally in the first position at a start of the opening movement and at the start of the closing movement, the at least one functional component also being generally in the first position at an end of an opening movement and at the end of the closing movement, the at least one functional component being moved from the first position to the second position for at least a portion of the opening movement and of the closing movement when the top linkage is between the open and closed positions, the at least one functional component being moved from the first position to the second position by a cooperation with the top element during the movement of the top linkage, the at least one functional component being pivotable in a second movement plane;
    wherein the movement of the at least one functional component from the first position to the second position provides clearance for at least one element that moves during movement of the top linkage; and
    the first and second movement planes are generally perpendicular to one another.

2. A top in accordance with claim 1, wherein the at least one functional component pivots between the first position the second position.

3. A top in accordance with claim 1, further comprising a separate drive device for moving the at least one functional component from the first position to the second position.

4. A top in accordance with claim 1, wherein:
    the top element has a slide element and the at least one functional component has a counter-slide element, the slide element and the counter-slide element cooperating to move the at least one functional component from the first position to the second position.

5. A top in accordance with claim 4, wherein:
    the counter-slide element is formed with a run-on chamfer.

6. A top in accordance with claim 1, wherein:
    the at least one functional component is pivotable between the first position the second position; and
    the top further comprising a spring operable to urge the at least one functional component from the second position to the first position.

7. A top in accordance with claim 1, wherein:
the at least one functional component is a locking device for locking the top in the open position.

8. A top in accordance with claim 1, further comprising:
a main bearing for supporting the top linkage;
the at least one functional component being disposed at the main bearing, the at least one functional component being connected to the main bearing by a hinge device.

9. A top in accordance with claim 1, further comprising:
a latching assembly disposed in a front region of the top, the latching assembly having a latching element;
the at least one functional component being a locking device having a latching counter-element;
the latching element of the latching assembly engaging the latching counter-element when the top is in the open position.

10. A top in accordance with claim 9, wherein:
the latching counter-element is a cut-out and the latching device is a latching hook that engages the cut-out for fixing the top in the open position.

11. A top in accordance with claim 9, wherein:
the latching counter-element of the locking device is an at least approximately plate-shaped element and the latching element of the latching device is a latching hook, the latching hook being movable under the plate-shaped element of the locking device when the top is in the open position, such that a movement of the top in the upward direction of the vehicle is prevented by the locking device.

12. A top in accordance with claim 1, wherein:
the at least one functional component is manually movable when the top is in the open position, to provide for the emergency actuation of the top from the open position to the closed position.

13. A top in accordance with claim 9, wherein:
the latching assembly disposed in a front region of the top is operable to latch the top in the closed position.

14. A convertible motor vehicle including a top in accordance with claim 1.

15. A top for a convertible motor vehicle, the top being movable between a closed position and an open position, the top comprising:
a top linkage operable to move the top between the closed position and the open position, the top linkage having an opening movement wherein the top linkage moves the top from the closed position to the open position, the top linkage further having a closing movement wherein the top linkage moves the top from the open position to the closed position, the top linkage including a top element movable therewith, the top element being pivotable in a first movement plane; and
the top linkage including at least one functional component, the functional component having a first position and a second position, the functional component in the first position being disposed in a plane that is generally parallel to the first movement plane, the at least one functional component being generally in the first position at a start of the opening movement and at the start of the closing movement, the at least one functional component also being generally in the first position at an end of an opening movement and at the end of the closing movement, the at least one functional component being moved from the first position to the second position for at least a portion of the opening movement and of the closing movement when the top linkage is between the open and closed positions, the at least one functional component being moved from the first position to the second position by a cooperation with the top element during the movement of the top linkage, the at least one functional component being pivotable in a second movement plane;
wherein the movement of the at least one functional component from the first position to the second position provides clearance for at least one element that moves during movement of the top linkage; and
the first and second movement planes are generally perpendicular to one another.

* * * * *